US010537165B2

(12) United States Patent
Besen et al.

(10) Patent No.: US 10,537,165 B2
(45) Date of Patent: Jan. 21, 2020

(54) SYSTEM INCLUDING A MAKEUP COMPACT AND CLIENT DEVICE FOR GUIDING EMAKEUP APPLICATION

(71) Applicant: L'OREAL, Paris (FR)

(72) Inventors: Rich Besen, Clark, NJ (US); Maya Kelley, San Francisco, CA (US); Guive Balooch, Clark, NJ (US); Yves Behar, San Francisco, CA (US); Qin Li, San Francisco, CA (US); Ilgu Cha, San Francisco, CA (US)

(73) Assignee: L'OREAL, Paris (FR)

( * ) Notice: Subject to any disclaimer, the term of this patent is extended or adjusted under 35 U.S.C. 154(b) by 0 days.

(21) Appl. No.: 15/863,300

(22) Filed: Jan. 5, 2018

(65) Prior Publication Data

US 2019/0208893 A1 Jul. 11, 2019

(51) Int. Cl.
| | |
|---|---|
| *A45D 44/00* | (2006.01) |
| *G06F 16/54* | (2019.01) |
| *G06K 9/00* | (2006.01) |
| *G09B 5/06* | (2006.01) |
| *G06T 11/60* | (2006.01) |

(Continued)

(52) U.S. Cl.
CPC ........... *A45D 44/005* (2013.01); *G06F 9/453* (2018.02); *G06F 16/54* (2019.01); *G06K 9/00268* (2013.01); *G06T 11/60* (2013.01); *G09B 5/065* (2013.01); *G09B 19/0023* (2013.01)

(58) Field of Classification Search
None
See application file for complete search history.

(56) References Cited

U.S. PATENT DOCUMENTS

| | | |
|---|---|---|
| 5,878,353 A | 3/1999 | Ul Azam et al. |
| 6,311,077 B1 | 10/2001 | Bien |
| 9,268,140 B2 | 2/2016 | Feola et al. |
| (Continued) | | |

OTHER PUBLICATIONS

IPhone Docking Station, posted online @https://www.etsy.com/listing/258209000/fathers-day-gifts-iphone-docking-station?ref=shop_review, Nov. 2, 2017 (Year: 2017).*

(Continued)

*Primary Examiner* — Yingchun He
(74) *Attorney, Agent, or Firm* — Oblon, McClelland, Maier & Neustadt, L.L.P.

(57) ABSTRACT

The present disclosure relates to a system for confident daily make-up application comprising a makeup compact and a client device. The system may be applied to specific facial features or entire faces for a complete style. The client device is configured to provide an interactive user experience by displaying templated instructions for makeup application. Templated instructions provide a 'paint-by-numbers' approach to daily makeup application. The makeup compact further comprises a client device housing, wherein the client device can be docked for the duration of makeup application and coaching. The client device housing is separated from a protective cover by a semi-transparent display that can allow for tactile interaction with the client device. The semi-transparent display, therefore, in this orientation, serves as a back projection plane, wherein the template instruction from the client device is communicated to the user as it appears on the semi-transparent display.

19 Claims, 11 Drawing Sheets

(51) Int. Cl.
*G09B 19/00* (2006.01)
*G06F 9/451* (2018.01)

(56) References Cited

U.S. PATENT DOCUMENTS

| | | |
|---|---|---|
| 9,692,864 B1 | 6/2017 | Arikat |
| 2003/0041871 A1* | 3/2003 | Endo ..................... A45D 42/00 132/301 |
| 2017/0024589 A1* | 1/2017 | Schumacher ......... G06F 3/0481 |

OTHER PUBLICATIONS

Instant makeup mirror, published @https://www.youtube.com/watch?v=PRsL4aOehBA, on Jan. 5, 2017 (Year: 2017).*

* cited by examiner

SYSTEM INCLUDING A MAKEUP COMPACT AND CLIENT DEVICE FOR GUIDING EMAKEUP APPLICATION

BACKGROUND

Field of the Disclosure

The present disclosure is related to a system that provides a makeup application experience combining coaching with convenience in a "paint-by-numbers" approach.

Description of the Related Art

While consumers aspire to recreate the looks of celebrities, a lack of formal training often limits the complexity of cosmetic techniques that may be attempted. For many, particularly beauty enthusiasts, video tutorials are an accessible and instructive way to discover and learn looks. This experience, however, is not easily translated to a daily routine where time is limited and efficiency is paramount. The tedium therein leaves consumers with few choices for efficient and confident makeup application of new styles in a daily routine. To this end, a portable, user-friendly makeup application system that makes it possible to apply complex techniques for daily use has yet to be developed.

The foregoing "Background" description is for the purpose of generally presenting the context of the disclosure. Work of the inventors, to the extent it is described in this background section, as well as aspects of the description which may not otherwise qualify as prior art at the time of filing, are neither expressly or impliedly admitted as prior art against the present invention.

SUMMARY

The present disclosure relates to a system, and method of the same, for confident and daily make-up application, comprising a semi-transparent surface and a client device having processing circuitry configured to sense a characteristic of a user and modify an output of the client device in response to the sensed characteristic.

According to an embodiment, the sensed characteristic is a spatial, physical or temporal characteristic, and includes facial features, skin color and skin tone.

According to an embodiment, the client device is configured to provide an interactive user experience by displaying video tutorials and templated instructions for makeup application. Templated instructions are generated following user style selection according to user preference and/or recommendation via client device-based software. Templated instructions provide a 'paint-by-numbers' approach to daily makeup application.

According to an embodiment, the semi-transparent surface is reflective on at least one side and overlays a display of the client device allow the user to observe a projected image and a reflected image simultaneously.

According to an embodiment, the client device is configured to receive input information from the user regarding a desired makeup result and to output guidance information on a method to achieve the desired result.

According to an embodiment, the input information from the user is based upon the user's evaluation of an augmented reality, wherein a desired look is visualized.

According to an embodiment, the output guidance information is image data, video data, audio data, or tactile data, and is provided in the context of sensed characteristic from a single session or from historical data from a plurality of sessions.

According to an embodiment, the client device-based software is configured to register a user's compact makeup palette and integrate the available makeup into recommendations and style selection.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The present disclosure addresses the need for a portable and user-friendly daily makeup application system that makes it possible for users to confidently wear new makeup styles. By integrating a makeup compact with a client device, including client device-based software, and a paint-by-numbers approach, the present disclosure provides consumers a confident, convenient experience for daily experimentation, and mastering, of new techniques. The system described herein aims to accomplish the following:

Provide a personalized user experience through capture of user facial features, color and tone using client device-based sensors.

Present a catalog of learnable techniques and styles according to the available color palette.

Allow user experimentation via user-directed coaching modules.

Limit tactile interaction with the client device by enabling audible command of the progression of the instructional unit.

Improve user mastery of techniques through feedback and coaching according to data received and processed from client device-based sensors.

Encourage users to discover new looks via integration with user social media presence.

Figure 1:
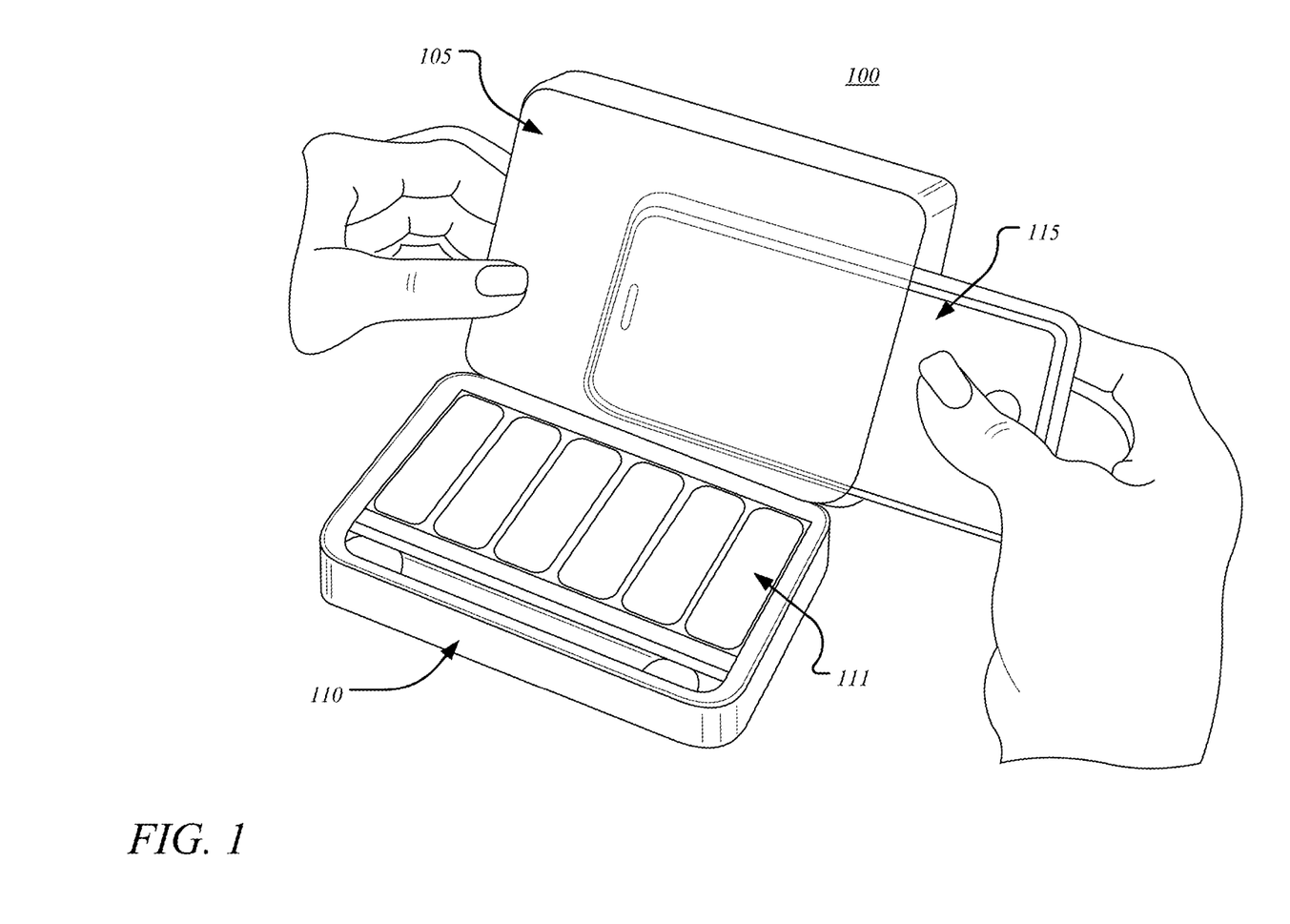
FIG. 1 is an exemplary illustration of the system of the present disclosure in a consumer environment, comprising a client device and a makeup compact.

FIG. 1 is an exemplary illustration of the system of the present disclosure in a consumer environment. The system 100 comprises a client device 115 and a makeup compact 110. A semi-transparent display 105 is disposed on the makeup compact 110, creating a partition between the client device 115 and the makeup compact color palette 111. In an embodiment, the client device 115 is a smartphone equipped with a collection of sensors for capturing a variety of characteristics of objects within a field of view. The makeup compact 110 can include one or more cosmetics, according to the color palette 111 desired by the user. The type of makeup available to the user is registered with the client device-based software to improve potential style recommendations to the user.

Figure 2A:
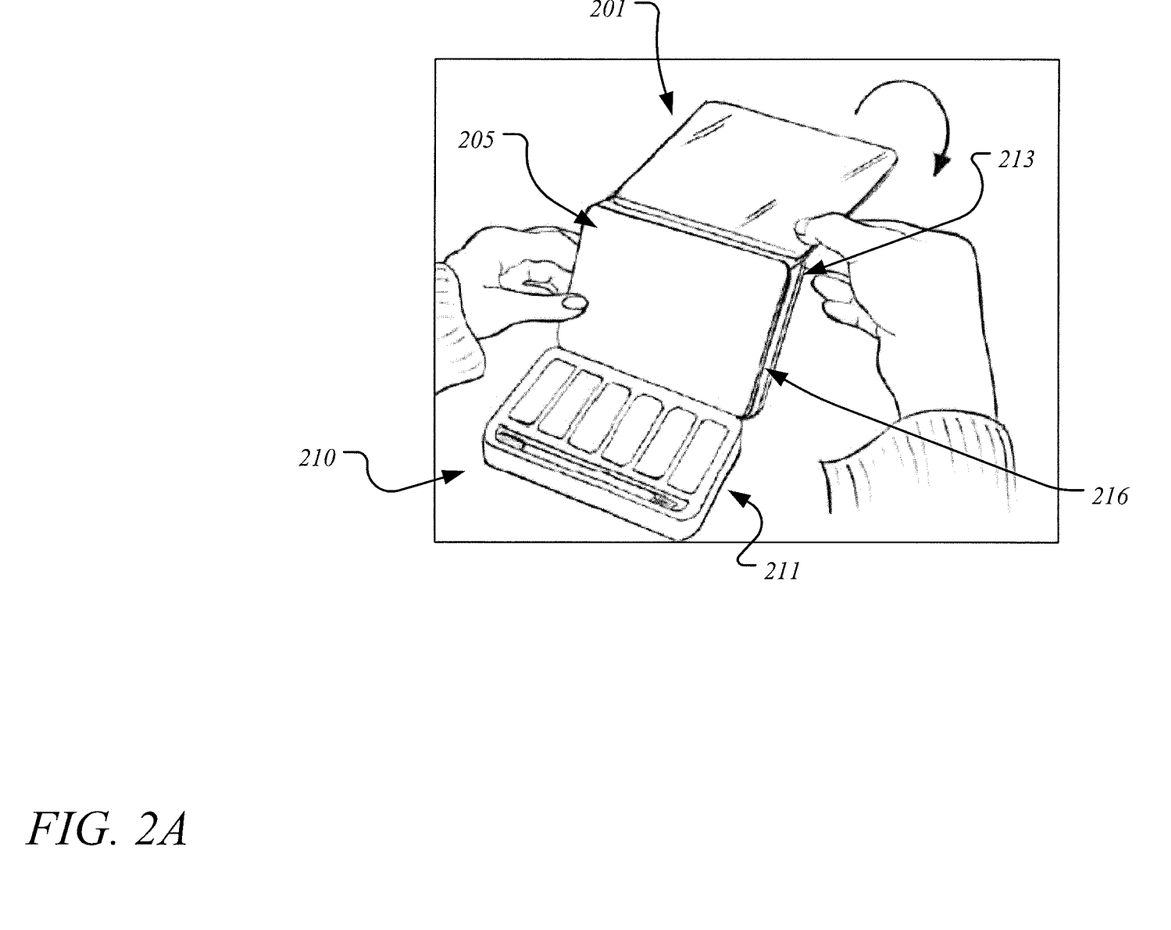
FIG. 2A is an exemplary illustration of the makeup compact of the present disclosure.

FIG. 2A is an exemplary illustration of the makeup compact of the present disclosure. The makeup compact 210 includes a color palette 211 comprising one or more cosmetics. When desired, the makeup compact 210 functions in a standard embodiment as a mirror, wherein the upper lid 213 of the makeup compact and the protective cover 201 are lifted and the semi-transparent display 205 is presented to the user. In an embodiment, the semi-transparent display 205 is a one-way mirror. In the absence of a light-emitting client device within the client device housing 216, the semi-transparent display 205 functions as a standard mirror from the perspective of the user. To implement the interactive user interface of the client device, the client device, with activated coaching module, is positioned within the client device housing 216. From the user's perspective, both a mirror reflection of the user and client device-generated objects will be visible simultaneously on through the semi-transparent display 205. A distance between the upper lid 213 of the makeup compact 210 and the semi-transparent display 205 is pre-determined according to the dimensions of a client device. In an embodiment, the client device is a smart phone typified by an Apple iPhone.

Figure 2B:
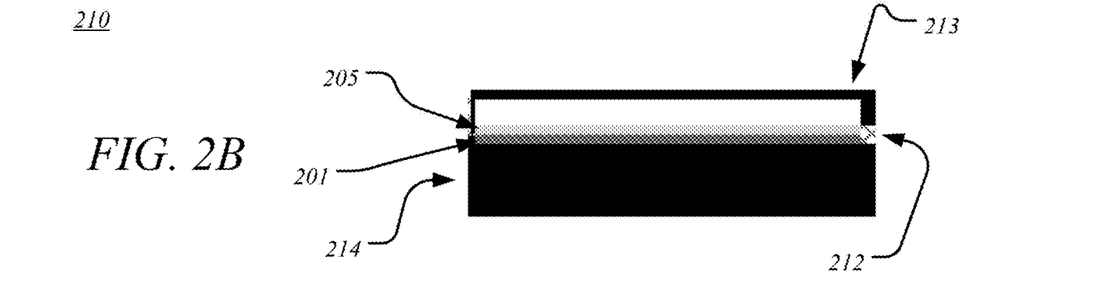
FIG. 2B, FIG. 2C, and FIG. 2D are step-wise schematics of the makeup compact and client device and the progression from protective cover to interactive semi-transparent display with client device.
Figures 2C, 2D:
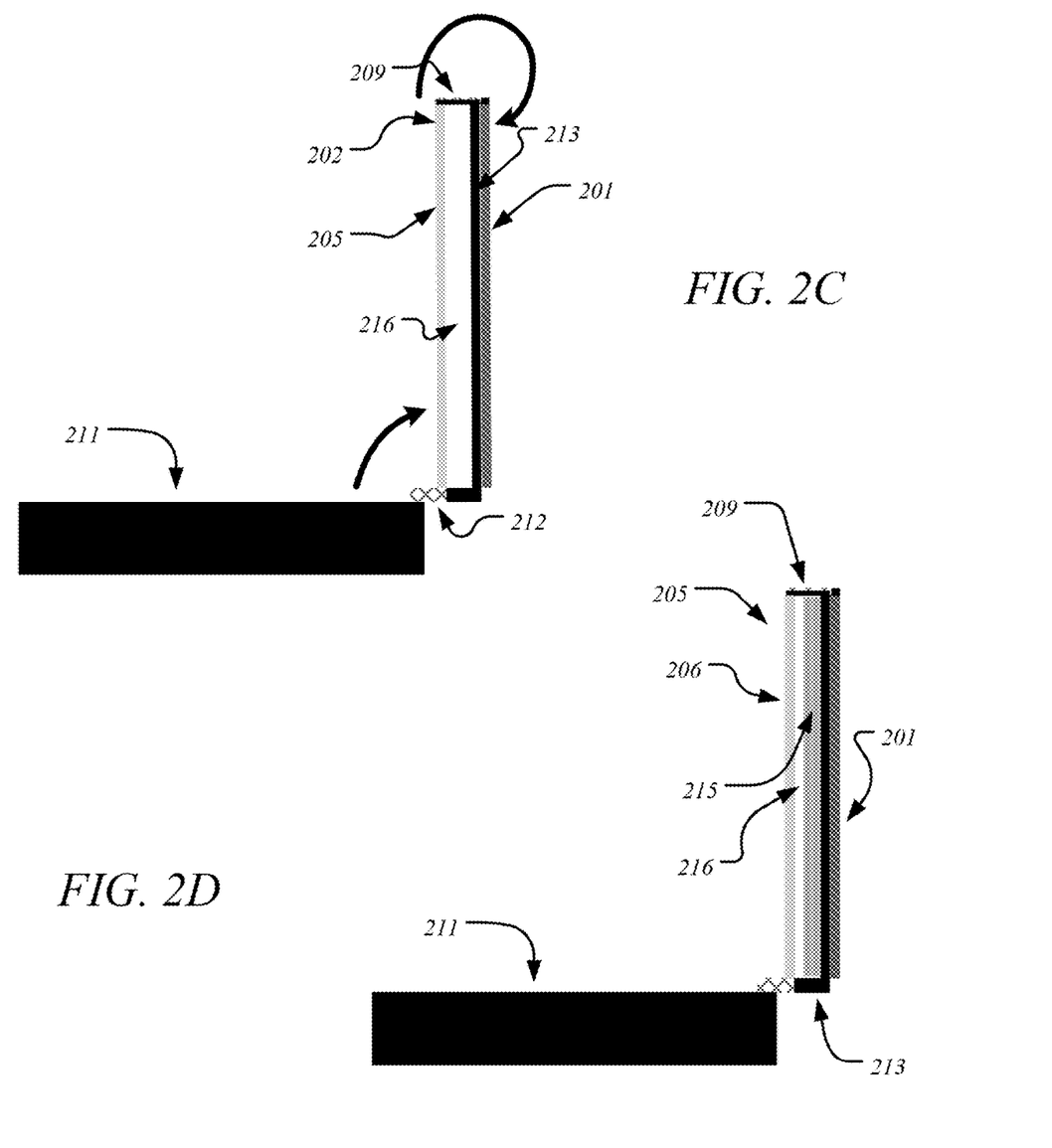

FIG. 2B, FIG. 2C, and FIG. 2D are step-wise schematics of a makeup compact 210 and a client device and the progression from protective cover to interactive semi-transparent display with client device. In FIG. 2B, the makeup compact 210 is in a closed position, with a protective cover 201 and semi-transparent display 205 seated against the body 214 of the makeup compact 210. A flexible hinge 212 connects the upper lid 213 of the makeup compact 210 to the body 214 of the makeup compact 210. In FIG. 2C, a user lifts the upper lid 213 of the makeup compact and exposes the protective cover 201 to the user. The upper lid 213 of the makeup compact is rotated about the flexible hinge 212. The protective cover 201 is then rotated about the flexible hinge 209 and the semi-transparent display 205 is exposed to the user. The semi-transparent display 205 is designed to function as a standard mirror in the absence of a client device 215 within the client device housing 216, as the functionality of the semi-transparent display 205 is realized only when a light source is present in the client device housing 216. In the absence of a client device, the semi-transparent display 205 can be used by the user in tandem with the makeup color palette 211 as a standard mirror. When an interactive user experience is desired a client device can be positioned within the client device housing 216, as described in FIG. 2D. A client device 215 is inserted into the client device housing 216 disposed between the semi-transparent display 205 and the upper lid 213 of the makeup compact. In an embodiment, the client device housing 216 is constructed with a depth pre-determined to accommodate a specific design of client device 215, such as an Apple iPhone. According to an additional embodiment, the client device housing 216 is constructed with a depth pre-determined to accommodate a universal design of client device 215, where the pre-determined depth is a known depth and is integrated within client device-based software to generate appropriate display objects on a display surface 206 of the semi-transparent display 205.

In an embodiment, the semi-transparent display 205 is fabricated such that transduction of tactile user commands to client device-based software can be performed. Examples of tactile input detection include, but are not limited to, resistive, capacitive, infrared grid, surface acoustic wave, and acoustic pulse recognition, and may be integrated within the client device-based software to receive user commands.

According to an embodiment, a protective screen-like touch sensitive film enables tactile sensing between the client device 215 and the semi-transparent display 205.

In another embodiment, one or more buttons disposed through the thickness of the semi-transparent display 205 allow direct user interaction with the client device 215.

In another embodiment, client device-based sensors can detect commands from the user, including, but not limited to, hand gestures or voice commands.

Figure 3A:
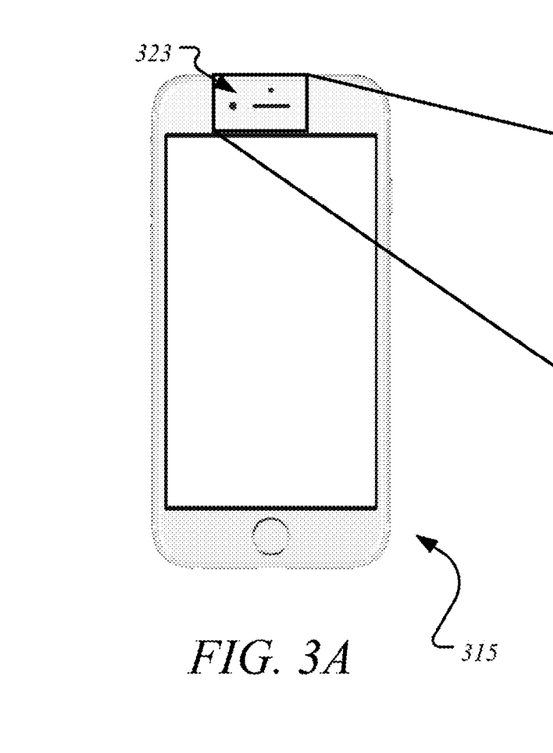
FIG. 3A is an exemplary embodiment of a client device.
Figure 3B:
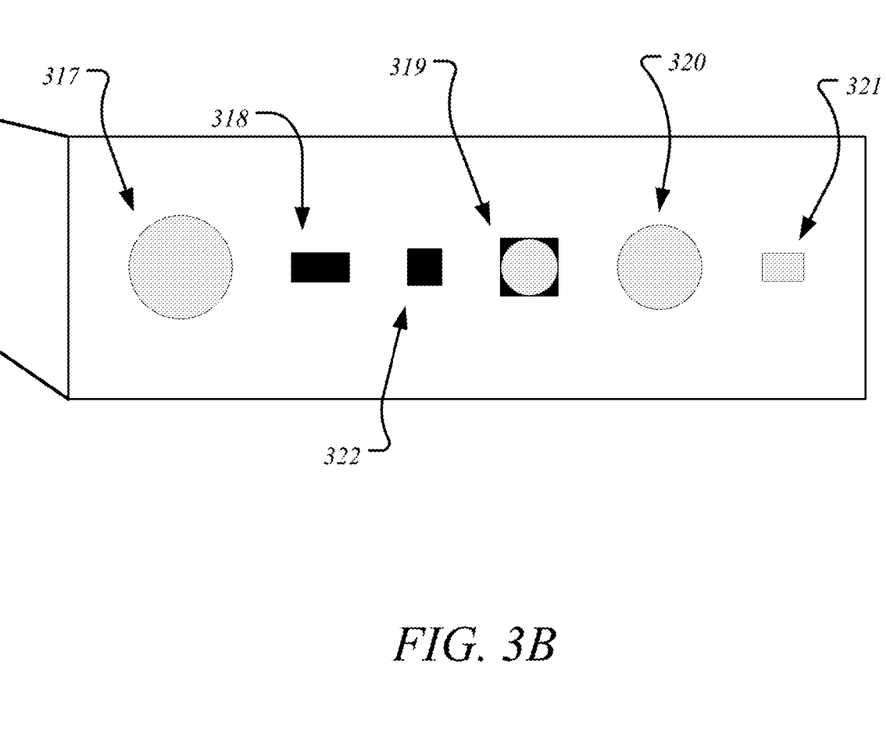
FIG. 3B is a schematic of client device-based sensors, according to an exemplary embodiment.

FIG. 3A is an exemplary embodiment of a client device. According to an embodiment, the client device 315 is a smartphone, including front-facing sensors 323 in addition to features of a smartphone considered to be standard (e.g. microphone, speakers), of the kind typified by an Apple iPhone. FIG. 3B is a schematic of these client device-based sensors, according to an exemplary embodiment. The front-facing sensors 323 of the client device 315 may include, but are not limited to, an infrared camera 317, an infrared flood illuminator 318, a proximity sensor 322, a dot projector 319, a visible light camera 320, and a visible light flood illuminator 321. The combination of the abovementioned front-facing sensors 323 allows for capture and recreation of realistic three-dimensional models of a user's facial features, skin color, and tone. Such depth-dependent digitization of the face is understood in the art, as evidenced by U.S. Pat. No. 9,582,889 B2, which is incorporated herein by reference. In an embodiment, recognition of the facial features is performed via digital reconstruction of two-dimensional images acquired from a visible light camera.

Figure 4A:
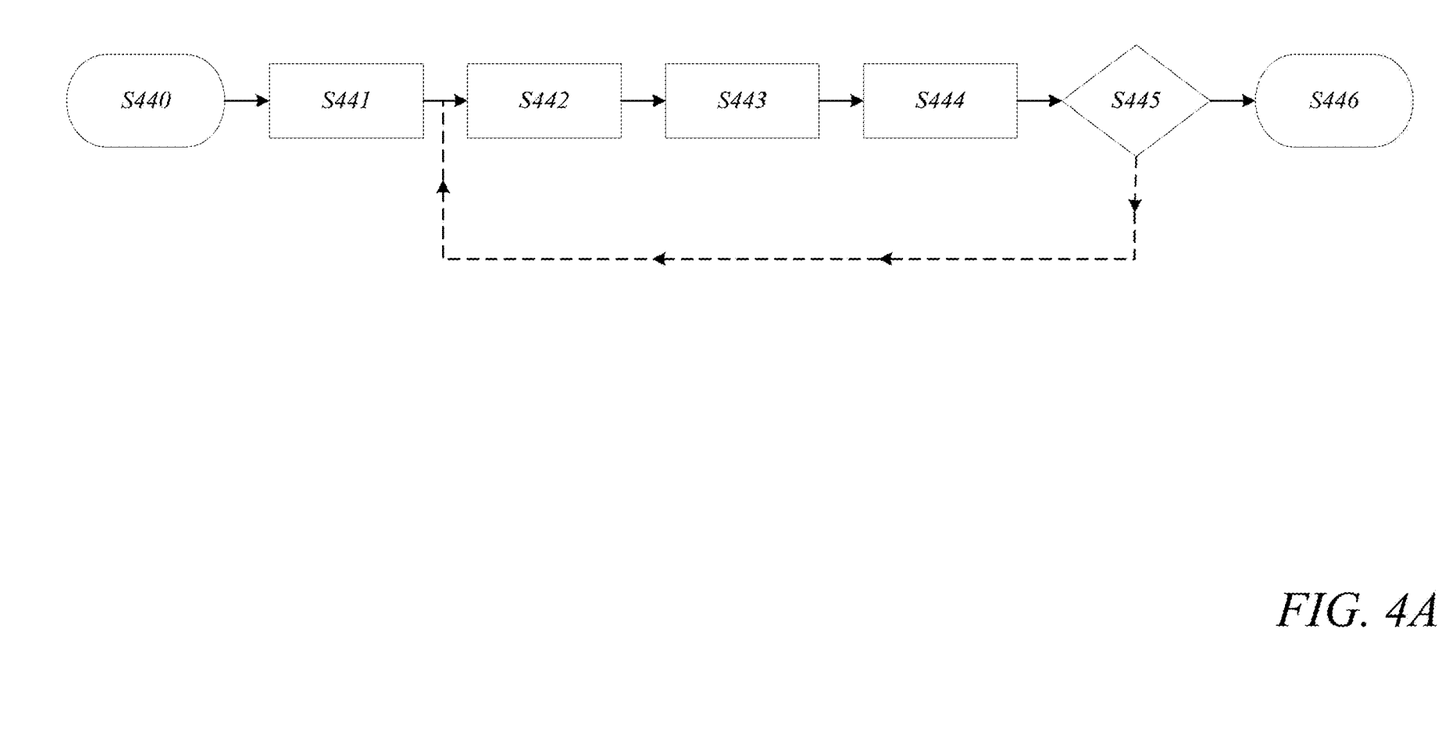
FIG. 4A is a flowchart of sensing and evaluation of sensor inputs during a coaching module, according to an exemplary embodiment.

FIG. 4A is a flowchart of sensing and evaluation of sensor inputs during a coaching module, according to an exemplary embodiment. Following user selection of the desired look, the client device prompts the user to place the client device horizontally within the client device housing of the makeup compact. Utilizing client device-based sensors (e.g. proximity sensor), the client device-based software determines the presence of the client device within the client device housing and initiates the instructional unit when the client device is in place S440. In order to provide an accurate display projection of the templated shapes of the instructional unit relative to the user, client device-based sensors are further utilized to locate, capture, and digitize a real time rendering of the user S441. These data are integrated with the user selected exercise to generate a display projection that illuminates a surface of the semi-transparent display, thus depicting spatially accurate templated shapes to the user via the semi-transparent display.

In an embodiment, the display projection is generated to appear similar to a reflection of the user. Client device-based software receives data from client device-based sensors related to the depth, position, and orientation of the user to determine the position of the user relative to the semi-transparent display. This relationship, in the context of the pre-determined distance between the client device and the semi-transparent display, allows for the rendering of a mirror-like reflection onto the semi-transparent display. Understanding this relationship allows user movements to be reacted to, such as translating an image to the left when the user moves to the right or scaling the image larger when the user moves closer to the semi-transparent display.

As the user applies makeup, the client device actively monitors user position, orientation, movement and facial features S442. Client device-based sensors, controlled by client device-based software, generate data including, but not limited to, user facial features, user head orientation, user depth, user motion, user speed, and color and tone, and store the acquired data to local storage, cloud-based storage, or a combination thereof. Stored data is accessed during display projection of future images to improve spatial projection of templated shapes relative to prior instances S443. To this end, stored data, including that which is related to relative user position and orientation, are used to predict future positions and orientations of the user so that adjustments to the display projection are more intuitive, allowing templated shapes to follow the contours and movements of the user S444. For example, initially, a user is applying makeup to the right side of the face and the client device display is projecting a templated shape onto the semi-transparent display, accordingly. As the user moves the head to more easily view a section of the face, client device-based software recognizes the movement and adjusts the display projection accordingly. There exists, however, delay in the rendering as the client device-based software generates the display projection. With subsequent use, the client device-based software will generate a library of prior user motions that can be called upon during future instances of similar motions. In this way, as the number of instances of a certain motion and stored data increase, the client device-based software will be able to better predict the velocity and direction with which a movement is occurring, thus eliminating lag time in display projection generation.

When the user has completed an instructional unit, the user provides an audible command, visual command, tactile command, or a combination thereof indicating the motion is completed, at which point a determination is made whether additional instructional units are required to complete the coaching module S445. If additional instructional units are required, the client device-based software progresses to instruction and display projection of a templated shape S442 of the next instructional unit. If the coaching module is complete, the client device-based software proceeds to completion S446.

According to an embodiment, data generated from client device-based sensors and stored to local storage, cloud-based storage, or a combination thereof, may be utilized in future coaching modules to enhance the prediction of user motion in the context of specific instructional units, thereby improving accuracy of display projections.

According to an embodiment, data generated from client device-based sensors and stored to local storage, cloud-based storage, or a combination thereof, may be utilized to provide real-time feedback to the user regarding user performance in the form of visual commands, audible commands, tactile commands, or a combination thereof.

According to an embodiment, time-coarse images of the user before, during, and after makeup application are used to evaluate user performance.

In another embodiment, user performance relative to a desired result of an applied technique is incorporated into future instruction. For example, if a user selects to apply an eye makeup technique to both eyes but fails to achieve the desired result with a first eye, client device-based sensors and software will acknowledge the discrepancy and modify instruction directed to a second eye to ensure symmetry across the user's face.

Figure 4B:
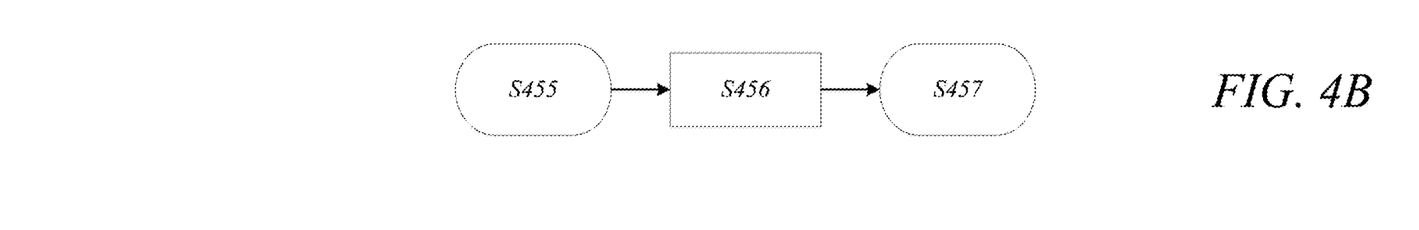
FIG. 4B through FIG. 4E are sub flowcharts of sensing and evaluation, according to an exemplary embodiment.

FIG. 4B is a sub flowchart of initialization of a coaching module, according to an exemplary embodiment. First, client device-based sensors, including a proximity sensor, are activated by the user following selection of a coaching module S455. Next, the user is instructed to place the client device into the client device housing S456. The proximity sensor housed within the client device detects the presence of the client device housing and sends a signal to the client device-based software to begin the coaching module S457. In an embodiment, the client device and client device housing further comprise wireless identification tags. These wireless identification tags, including, but not limited to, near field communication devices, provide a unique makeup compact identifier that would expedite the user onboarding experience, instantly identifying the available makeup palette.

Figure 4C:
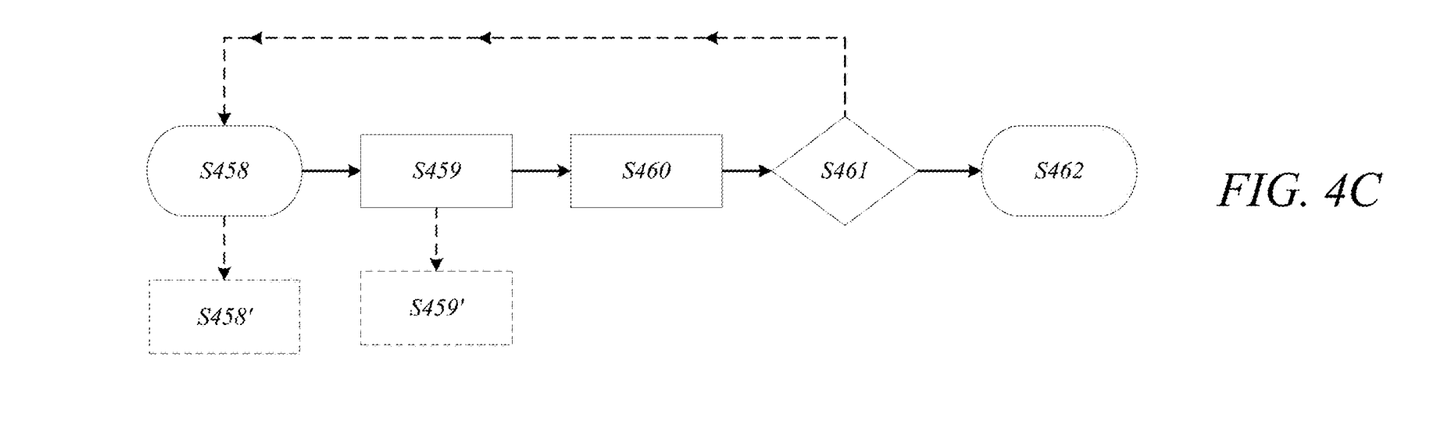

FIG. 4C is a sub flowchart of receipt of sensed data and output by the client device, according to an exemplary embodiment. First, the client device-based software receives sensed data from the client-device base sensors S458 and stores it to local-based and cloud-based storage S458'. Next, the sensed data is processed by the client device-based software S459, and the processed data is stored to local-based and cloud-based storage S459'. The processed data is then analyzed by the client device-based software S460 and it is determined if an adjustment to the client device output is needed S461. If an adjustment is needed, the client device-based software modifies the client device output, accordingly S462. Otherwise, passive evaluation of the transmitted sensed data will continue. For example, the client device-based software receives sensed data relating to user position relative to the semi-transparent display from client-device base sensors S458, and stores the sensed data to local-based and cloud-based storage S458'. The sensed data is then processed by the client device-based software S459 and stored to local-based and cloud-based storage S459'. The processed data is then analyzed by the client device-based software S460 to determine if the position of the user relative to the semi-transparent display has changed S461. If it is determined that the relative position has changed, the client device-based software will modify the display projection, accordingly S462. If the relative position of the user to the semi-transparent display has not changed, passive evaluation of the transmitted sensed data will continue.

Figure 4D:
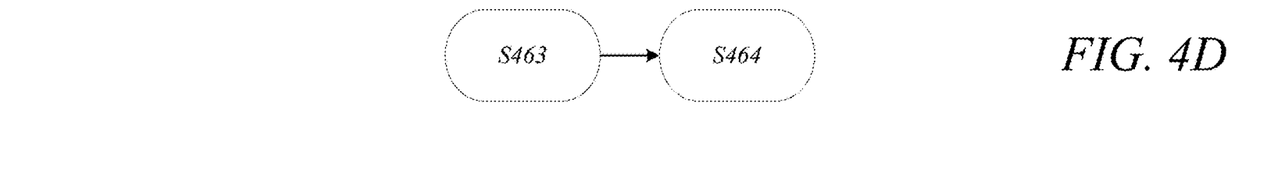

FIG. 4D is a sub flowchart of the output by the client device-based software, according to an exemplary embodiment. Following sensing, transmission, and evaluation of the sensed data, the client device-based software may determine it appropriate to modify the output of the client device S463, wherein the output of the client device includes video and audio data. For example, as a user performs a coaching module and the client device-based software receives sensed data, it may be appropriate to provide visual feedback to the user regarding the user's performance, wherein the feedback allows for self-assessment of makeup application S4645. This type of feedback may comprise side-by-side comparisons of the desired result and the user's result.

Figure 4E:
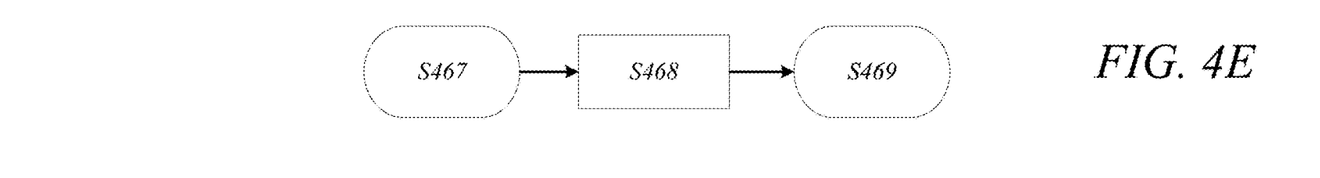

FIG. 4E is a sub flowchart of the output by the client device-based software, according to an exemplary embodiment. Following sensing, transmission, and evaluation of the sensed data, the client device-based software may determine it appropriate to modify the output of the client device S467, wherein the output of the client device includes video and audio data. As a user performs a coaching module and the client device receives sensed data, it may be appropriate to provide feedback to the user regarding the user's performance. In an embodiment, the client device provides coaching suggestions based upon an evaluation of the sensed data relative to prior instances of the sensed data or global averages of the sensed data for specific techniques S468. For example, client device-based sensor data indicates the user's head motion may be overactive during makeup application. Compared to global averages or previous instances of sensed data for the user, the client device-based software correlates poor makeup performance, compared to the projected template, with overactive head movement. In turn, the client device may provide supportive feedback to the user via video and audio output, recommending solutions to improve future user performance S469.

Figure 5:
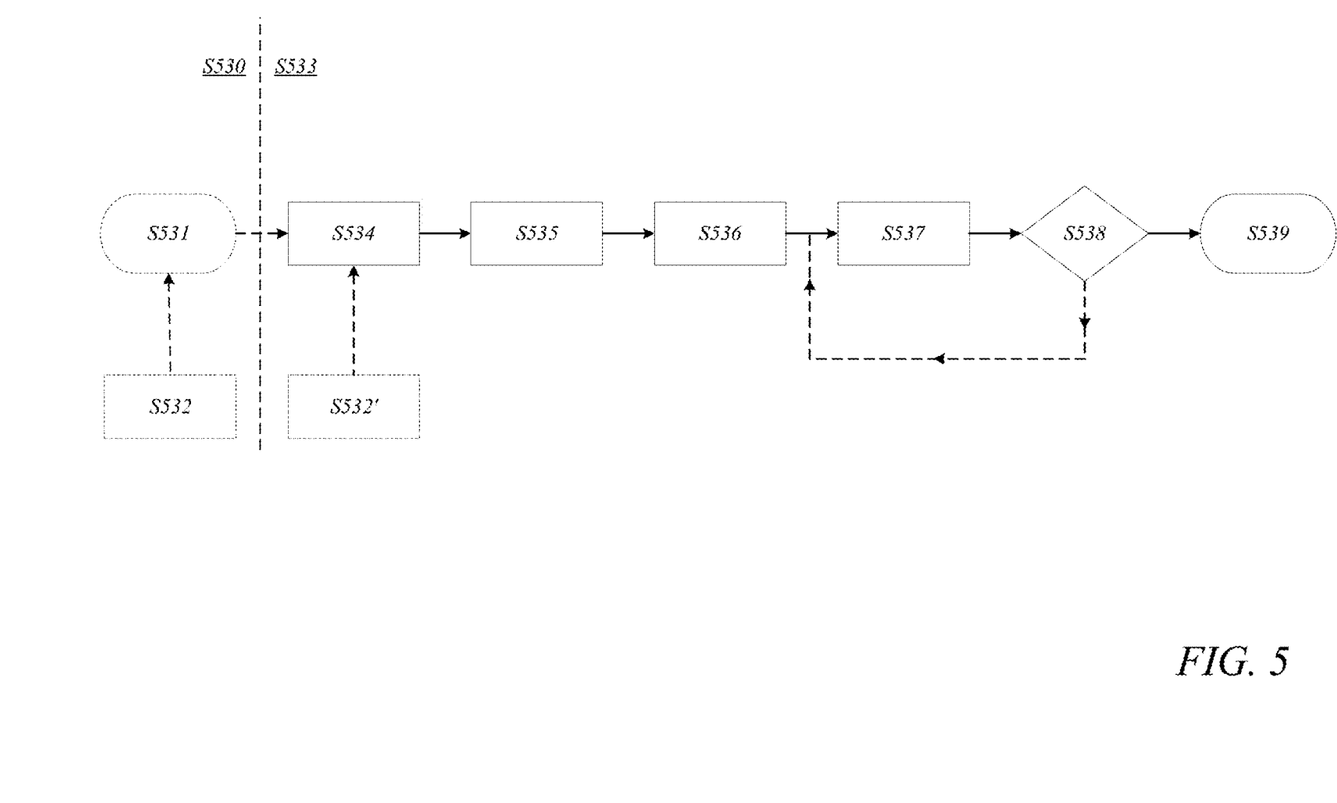
FIG. 5 is a flowchart of a user experience during a coaching session, according to an exemplary embodiment.

FIG. 5 is a flowchart of a user experience during a coaching session, according to an exemplary embodiment. During user onboarding S530, client device-based sensors are used to perform a three-dimensional digitization S531 of the facial features, color, and tone of the user. Client device-based software then adjusts to calibrate the image and color projection according to ambient light. Next, the user selects the compact color palette available at home S532, identifying and registering this information within the client device-based software, thereby defining the scope of possible coaching modules according to the available color palette. In an embodiment, the client device-based software is further capable of exploiting collected data regarding facial features, color and tone to recommend color palettes best suited to the user. This collected data could further include a series of lifestyle questions aimed at identifying a color palette match. If the user has available the same makeup compact, and color palette, at each training session, user profile creation is a one-time event.

Once a user profile has been created and the makeup compact has been identified and registered, everyday coaching may begin S533. First, a user selects a makeup coaching module S534. For example, the user may select a specific style or look of interest. Alternatively, client device-based software may intelligently offer occasion-based inspirations that complement the user.

In an embodiment, the client device-based software may offer a variety of styles including, but not limited to, everyday office, first date, movie night, and fine dining. For each occasion, a style or look is offered to the user. To this end, client device software may also incorporate social media content associated with the user's user profile to better inform and predict styles of interest to the user based upon preferences indicated within the user's social media presence.

In another embodiment, augmented reality capabilities enable the user to realize a look prior to look selection. Utilizing client device-based sensors, the client device utilizes prior and active depth mapping, including light filtering, to provide a realistic rendering of what a style may look like on a user.

According to an embodiment, the user may indicate at this step that a color palette other than the color palette indicated at user profile creation is in use S532'. The client device-based software will adjust recommended occasion-based looks accordingly and present them to the user for look selection.

Following user selection of the desired coaching module S534, the user is prompted by the client device-based software to insert the client device horizontally into the client device housing within the makeup compact and manipulate the upper lid and protective cover until the semi-transparent display is visible S535. When positioned, the client device-based sensors (e.g. proximity sensor) perceive the location of the client device relative to the makeup compact and initiate an instructional unit of the coaching module S536. An instructional unit can include, but is not limited to, video tutorials, projection of templated shapes, or a combination thereof. Next, user controlled step-by-step makeup application steps are projected from the client device display and are visible through the semi-transparent display S537. A video tutorial of a first step of the instructional unit is displayed. Following the video tutorial, the appropriate templated shapes are projected onto the semi-transparent display. As the user completes each makeup application step according to the templated shapes projected from the client device display, the user indicates as much to the client device-based software via audible command, visual command, tactile command, or a combination thereof. If additional steps are required to complete the instructional unit (e.g. if the instructional unit requires makeup application of more than one cosmetic) S538, the instructional unit begins the next step, including the next step of the video tutorial and the appropriate templated shapes. If no additional steps are required S538, makeup application of the current instructional unit has ended S539. If additional instructional units are required to complete the coaching module (e.g. if the coaching module is a full face style compared to eye style only, or if the coaching module is a two eye style compared to a one eye style only) S538, the coaching module begins the next instructional unit. If no additional instructional units are required S538, makeup application has ended and the client device-based software returns to a home menu S539.

In an embodiment, the client device-based software utilizes data from client device-based sensors to evaluate user performance and to provide feedback for improvement of makeup application. Feedback may be audible feedback, visual feedback, tactile feedback, or a combination thereof.

In an embodiment, the client device-based software is connected to third party applications including social media platforms, allowing the user to promote a style or look amongst a social network. Moreover, publishing results to a social network permits social feedback beyond the technical feedback provided by the client device-based software.

In an embodiment, the client device-based software may predict future styles and looks of interest to the user and recommend products related to the realization of those styles and looks.

According to an embodiment, the compact coach does not include a semi-transparent display and user commands and user prompts are provided directly from the client device display.

Figure 6A:
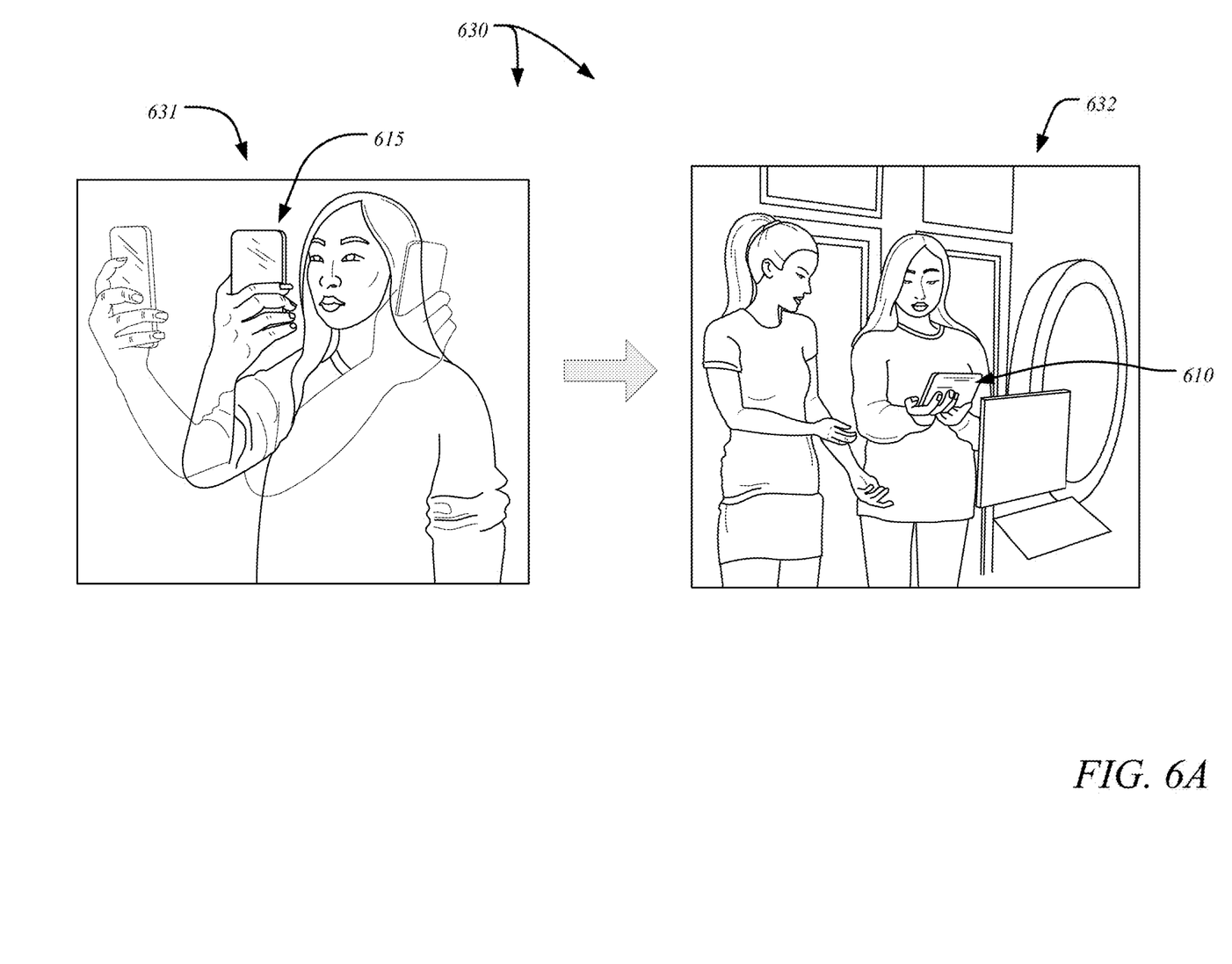
FIG. 6A is an illustration of the flowchart of user experience during an onboarding portion of a coaching session, according to an exemplary embodiment.

FIG. 6A is an illustration of the flowchart of user experience during an onboarding portion of a coaching session, according to an exemplary embodiment. During user onboarding 630, client device-based sensors are used to perform a three-dimensional digitization 631 of the facial features, color, and tone of the user. To do this, the user is instructed to hold and move the client device 615, or smartphone, at positions relative to their face to fully capture three-dimensional facial features and, in particular, depth mapping. Client device software then adjusts to calibrate the image and color projection according to ambient lighting. Next, the user selects the makeup compact 610, including color palette, available at the home, identifying and registering this information within the client device-based software 632. This identification and registration of the available makeup compact and color palette defines the scope of possible styles and looks. If the same makeup compact and color palette is available to the user at each coaching session, user profile creation, wherein the makeup compact and color palette are identified and registered, is a one-time event.

Figure 6B:
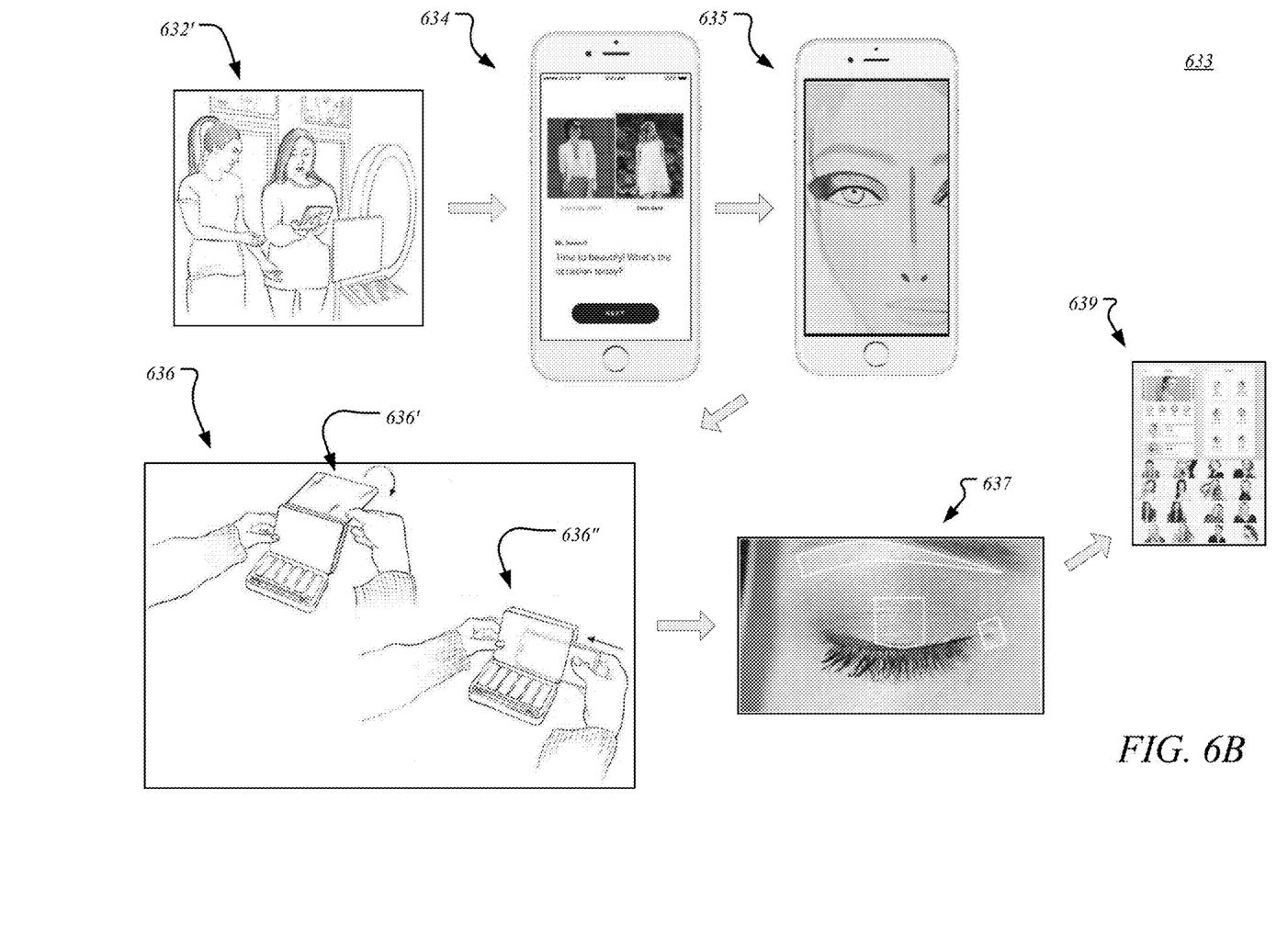
FIG. 6B is an illustration of the flowchart of user experience during a makeup application module of a coaching session, according to an exemplary embodiment.

Once a user profile has been created and makeup compact and color palette have been identified and registered, everyday training 633 may begin. FIG. 6B is an illustration of the flowchart of user experience during a makeup application module of a coaching session, according to an exemplary embodiment. First, a user confirms that that the makeup compact and color palette currently available are the same as that which was identified and registered during user profile creation 632'. If this is not the case, the new makeup compact and color palette can be identified and registered to inform the client device-based software of the available styles and techniques. Next, the user selects a desired makeup style or look 634. For example, this may be based upon an upcoming event or specific occasion. The client device-based software can also intelligently offer occasion-based inspirations that complement the user.

In an embodiment, the client device-based software may offer a variety of styles including, but not limited to, everyday office, first date, movie night, and fine dining. For each occasion, a style or look is offered to the user. To this end, client device software may also incorporate social media content associated with the user's user profile to better inform and predict styles of interest to the user based upon preferences indicated within the user's social media presence.

To aid the user in style and look selection, augmented reality capabilities enable the user to realize a style prior to look selection. Utilizing client device-based sensors, the client device utilizes prior and active depth mapping, including light filtering, to provide a realistic rendering of what a style may look like on a user 635.

Following user selection of the desired style or look, the client device-based software prompts the user to insert the client device into the client device housing 636. The user lifts and rotates the protective cover to expose the semi-transparent display residing underneath 636'. The client device is then inserted into the client device housing and positioned wherein the semi-transparent display is between the user and the client device 636". Upon proper seating, client device-based sensors perceive co-location of the client device with the makeup compact and initiate the instructional unit. The client device-based software then begins playing a first video tutorial of the instructional unit and then projecting templated shapes from the client device display 637. These templated shapes, indicated by white outlined objects in FIG. 6B, are customized to the facial features of the user and are presented similarly to a "paint-by-numbers" approach, wherein each shape corresponds to a specific makeup cosmetic. Following completion of each step in an instructional unit by the user, the user indicates to the client device-based software via verbal command, visual command, tactile command, or a combination thereof, that the current step is completed. If additional steps in the instructional unit, or additional instructional units in the coaching module, are required, the coaching session proceeds to initialization of subsequent video tutorials and templated shapes. Otherwise, the coaching module, and instructional unit therein, is complete and the user is invited to favorite, share, and explore other coaching module styles and looks in a connected environment 639. In an embodiment, if the user is satisfied with the technique or would like to save the technique for continued coaching and improvement at a later time, the client device software allows the user to end the training and favorite the technique. In an embodiment, the client device-based software encourages the user to explore new techniques in accordance with the just completed coaching module and the social media preferences of the user. Further, the user may be invited to share the finished look on social media platforms to obtain social feedback or to purchase additional products to improve the user's abilities and performance.

In an embodiment, during the instructional unit, client device-based sensors actively monitor the performance of the user and compare output metrics to established standards for corresponding techniques. If it is determined, for example, that the user is applying the incorrect cosmetic, the client device may provide guidance and encouragement to the user via audible alerts, visual alerts, tactile alerts, or a combination thereof. The user may, in turn, respond to the alert and continue makeup application with the confidence of knowing the technique is being performed appropriately.

Figure 7:
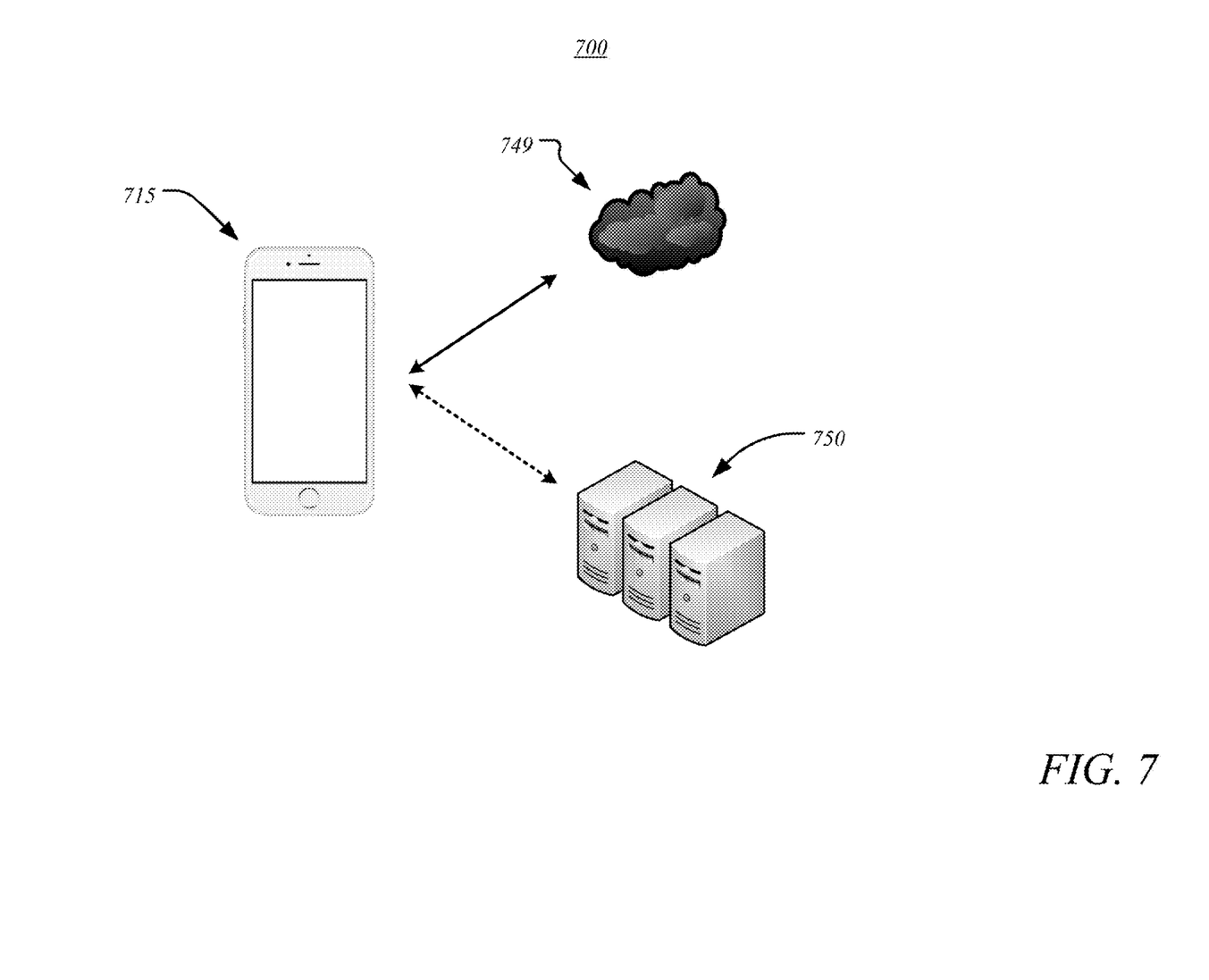
FIG. 7 illustrates the relationship between a client device and a cloud-based computing system including external servers and Internet, according to an exemplary embodiment.

FIG. 7 illustrates the relationship between a client device and a cloud-based computing system including external servers and the Internet, according to an exemplary embodiment. In an embodiment, the illustration includes an exemplary system 700 of a makeup application coaching tool. The system 700 includes at least a client device 715, or a smartphone, according to an embodiment. The system 700 may further include one or more external servers 750 which are implemented as part of a cloud-computing environment and in communication with the system 700 through the Internet 749. The one or more external servers 750 can store user data, including product data related to makeup brand, cosmetic brush type, makeup compact use and color palette, as well as protocols and routines, tutorials, and other $3^{rd}$ party services, as integrated. Following completion of a coaching module, information related to available products from preferred brands may be displayed to the user via the user interface. In an embodiment, the client device-based software may also provide access to a user's social media accounts (e.g. Facebook, Twitter, Snapchat, Instagram) so that they might share their new style or look.

Further, the user interface or the client device can display tutorials on fundamentals of makeup application. The user interface can create and download protocols for a regimen or routine. The user interface can train, track usage and compare the tracked usage to the protocol, the regimen, and the routine. The user interface can calculate a score based on the tracked usage. The user interface can store the scores and the tracked usage of the coaching software in the memory of the client device. Moreover, the user interface can be used to make a purchase of any products related to the makeup products registered within the client device-based software as well as recommendations of color tones, product lines, and other products related to the current style, look, or future experimental techniques.

Figure 8:
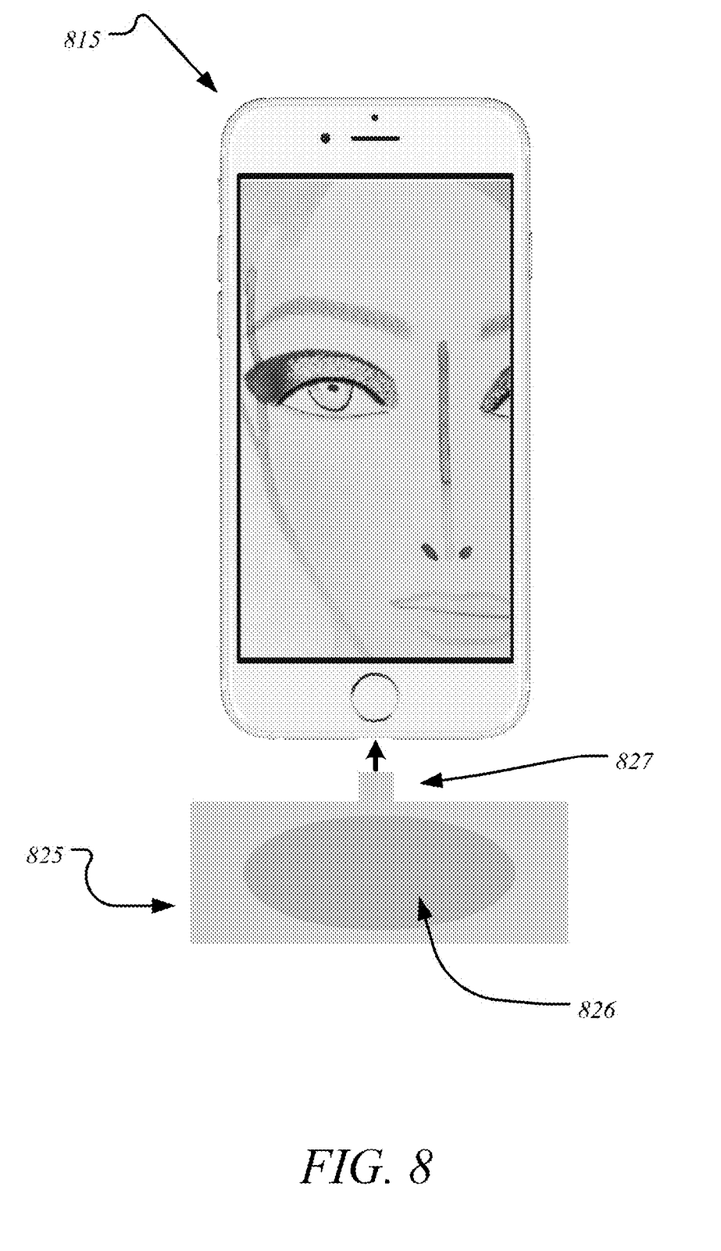
FIG. 8 is an illustration of the system, according to an exemplary embodiment of the present disclosure, wherein the makeup compact is a single makeup intended for on-the-go use and touch ups.

FIG. 8 is an illustration of the system, according to an exemplary embodiment of the present disclosure, wherein the makeup compact is a single cosmetic makeup compact intended for on-the-go use and touch ups. FIG. 8 illustrates a compact touchup kit 825 that includes one or more cosmetics meant for touchup sessions 826. The compact touchup kit 825 can be connected to a client device 815 via compact touchup connector 827. The client device 815 can then recognize the type of compact touchup kit 825 in use and the available cosmetics therein. The client device-based software can propose styles and looks based on the type of attached compact touchup kit 825, according to the above-mentioned process, or can allow for touchups via a mirror-like use of the client device-based software. Such electrical connection of a makeup compact to a client device is understood in the art, as evidenced by U.S. Pat. No. 9,692,864 B1, which is incorporated herein by reference.

In an embodiment, the compact touchup kit 825 is used without a semi-transparent display and client device housing. The client device 815 is employed as a display for templated shapes.

In an embodiment, the compact touchup kit 825 is used with a limited coaching module functionality, wherein a style is selected (e.g. foundation) and the client-device based software generates the templated shapes appropriate for the selected style. The templated shapes generated for a single style respond similarly to the instructional units of the full coaching session, adapting to movements of the user and providing feedback where appropriate.

In an embodiment, housing for a makeup applicator is disposed within the compact touchup kit 815, creating an all-in-one system for on the go makeup application.

Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A system, comprising:
   a surface configured to show a face of a user back to the user when the user is facing the surface;
   a housing; and
   a client device removably-seated within the housing, the client device having processing circuitry configured to sense a characteristic of the user and modify an output of the client device in response to the sensed characteristic, wherein
   the surface is configured to be between the housing and the face of the user, and
   the surface is a semi-transparent surface that is reflective on at least one side and overlays a display of the client device, the semi-transparent surface allowing a visual object displayed on the display to be visible on the reflective side of the semi-transparent surface while the reflective side simultaneously shows a reflection of the user viewing the reflective side.

2. The system according to claim 1, wherein the sensed characteristic of the user is a spatial characteristic of the user, a physical characteristic of the user, a temporal characteristic of the user, or a combination thereof.

3. The system according to claim 2, wherein the physical characteristic of the user is a facial feature, skin color, skin tone, or a combination thereof.

4. The system according to claim 1, wherein the client device is further configured to receive input information from the user regarding a desired result, and to output guidance information on a method of using a makeup compact to achieve the desired result.

5. The system according to claim 4, wherein the input information from the user is a selection of an image from a database.

6. The system according to claim 4, wherein the input information from the user is in response to a prompt from the client device, the client device being further configured to wirelessly communicate with remote user profiles.

7. The system according to claim 4, wherein the input information from the user is based upon user evaluation of an augmented reality of the desired result.

8. The system according to claim 4, wherein the output guidance information is image data, video data, audio data, tactile data, or a combination thereof related to using the makeup compact to achieve the desired result.

9. The system according to claim 4, wherein the output guidance information is based on sensed characteristics for a single continuous session of usage of the system, multiple sessions of usage of the system, or a combination thereof.

10. A method, implemented by a system that includes a surface configured to show a face of a user back to the user when the user is facing the surface, a housing, and a client device removably-seated within the housing, the method comprising:
    sensing, by the client device, a characteristic of the user; and
    modifying an output of the client device in response to the sensed characteristic, wherein
    the surface is configured to be between the housing and the face of the user, and
    the surface is a semi-transparent surface that is reflective on at least one side and overlays a display of the client device, the semi-transparent surface allowing a visual object displayed on the display to be visible on the reflective side of the semi-transparent surface while the reflective side simultaneously shows a reflection of the user viewing the reflective side.

11. The method according to claim 10, wherein the sensed characteristic of the user is a spatial characteristic of the user, a physical characteristic of the user, a temporal characteristic of the user, or a combination thereof.

12. The method according to claim 11, wherein the physical characteristic of the user is a facial feature, skin color, skin tone, or a combination thereof.

13. The method according to claim 10, further comprising receiving, by the client device, input information from the user regarding a desired result, and outputting, by the client device, guidance information on a method of using a makeup compact to achieve the desired result.

14. The method according to claim 13, wherein the input information from the user is a selection of an image from a database.

15. The method according to claim 13, wherein the input information from the user is in response to a prompt from the client device, the client device wirelessly communicating with remote user profiles.

16. The method according to claim 13, wherein the input information from the user is based upon user evaluation of an augmented reality of the desired result.

17. The method according to claim 13, wherein the output guidance information is image data, video data, audio data, tactile data, or a combination thereof related to using the makeup compact to achieve the desired result.

18. The method according to claim 13, wherein the output guidance information is based on sensed characteristics for a single continuous session of usage of the system, multiple sessions of usage of the system, or a combination thereof.

19. A system, comprising:
 a surface configured to show a face of a user back to the user when the user is facing the surface; and
 a client device removably-seated within a housing and having processing circuitry configured to sense a position of the user relative to the client device and modify an output of the client device in response to temporal changes in the sensed position of the user, wherein
 the surface is a semi-transparent surface that is reflective on at least one side and overlays a display of the client device, the semi-transparent surface allowing a visual object displayed on the display to be visible on the reflective side of the semi-transparent surface while the reflective side simultaneously shows a reflection of the user viewing the reflective side.

* * * * *